July 5, 1932.  J. MARCHESE ET AL  1,865,871

PRESSURE INDICATOR

Filed Aug. 25, 1930

INVENTORS.
John Marchese
Maurice Byron D'Orsay
BY
ATTORNEY.

Patented July 5, 1932

1,865,871

UNITED STATES PATENT OFFICE

JOHN MARCHESE, OF PORTLAND, AND MAURICE BYRON D'ORSAY, OF ALOHA, OREGON, ASSIGNORS, BY MESNE ASSIGNMENTS, TO TIRE SAVERS CORPORATION, LTD., OF SAN JOSE, CALIFORNIA, A CORPORATION OF NEVADA

PRESSURE INDICATOR

Application filed August 25, 1930. Serial No. 477,686.

This invention relates to pressure indicators, and particularly to a pressure indicator adapted to use on pneumatic tires. The pneumatic tire and its mode of use and operation need no explanation. The life or period of efficient use of a pneumatic tire depends largely upon maintaining the proper air pressure therein, the proper pressure being a predetermined amount according to the size and construction of the tire; the weight and type of vehicle and the service in which the vehicle is engaged.

The present trend of mechanical construction of tires is to what is known as the balloon tire, which is comparatively large circumferentially in transverse cross section, as compared with the type of tires which have heretofore been used. The balloon type of tire requires less air pressure per square inch than the older type of tire, but should have the air pressure within it more constant and uniform. The use of the balloon tire and recently adopted enlarged hubs, require shorter length of wheel spokes between felloe and hub if the total wheel diameter is not to be increased, and for various reasons it is not desirable to increase the wheel diameter.

The object of the invention is to provide an indicator, simple and economical in construction, which is easily attached and detached to the well known type of valve stem of pneumatic tires, and which will be short enough to be conveniently attached in the limited space between the felloe and hub.

Since it will be recognized that the amount of shock received by the gauge of such an indicator will be very great and almost continuous while the vehicle is in motion, and that the effect of centrifugal force must be discounted or overcome it is an object of the invention to provide a very rugged, accurate, simply constructed pressure indicator preferably without springs as the principal medium whereby the air pressure is transmitted to the gauge, since springs used for that purpose are subject to crystalization, loss of compression and displacement; a further object is to provide a pressure indicator without gears, cogs, quadrants or rack and pinion movement operating from the center of the device, they all having a tendency to lose their initial accuracy under the constant vibration and shock to which a tire pressure indicator is subjected by direct contact with roadways while being revolved at high speeds. It is a further object to provide a means to open the ordinary valve of the tire stem so that the pressure in the tire may be recorded on the gauge and yet to maintain the operative efficiency of the valve in the stem so that the air will be maintained in the tire when necessary to remove the gauge to change a tire or in case the gauge is stolen.

In accomplishing these objects, it will be realized that the available space for mechanism is very limited and therefore the arrangement of parts must be such as not to defeat the purpose of the invention.

With the above mentioned and other objects in view, the invention consists in the novel construction and combination of parts hereinafter described, illustrated in the accompanying drawings, and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein—

Figure 1:
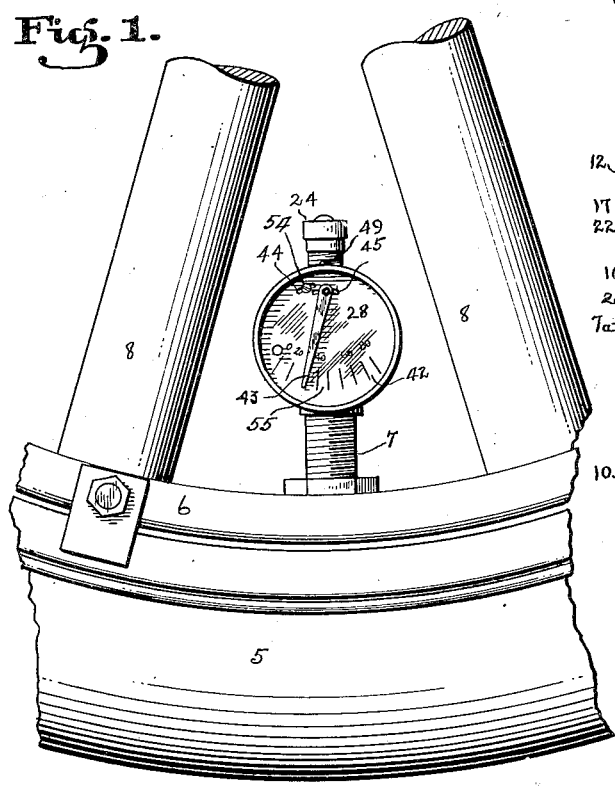
Fig. 1 is a front elevation of indicator mounted on a tire valve stem, showing broken-away portions of tire, rim and spokes.

Referring more particularly to the several views of the drawings, wherein like characters designate corresponding parts—5 represents, generally, a pneumatic tire mounted in the usual manner on a vehicle wheel 6. Such tires are usually of a well known double tube type having an inner tube (not shown) and casing. A tire stem 7 is tightly secured in the inner tube and extends through the rim and felloe of the wheel, as shown in Fig. 1, being located between spokes 8 which, in the artillery type wheel radiate from the wheel hub (not shown), said stem being provided with a normally closed one-way valve 7a, of any well known and suitable type, but which may be maintained normally open by a plunger when the gauge is mounted on the tire stem.

Figure 2:
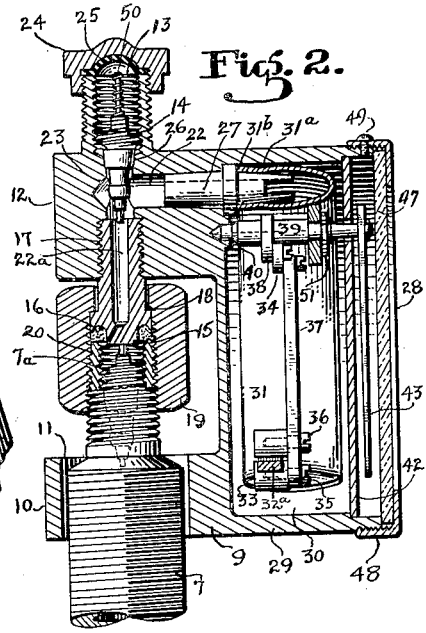
Fig. 2 is an enlarged side view of a vertical section.
Figure 3:
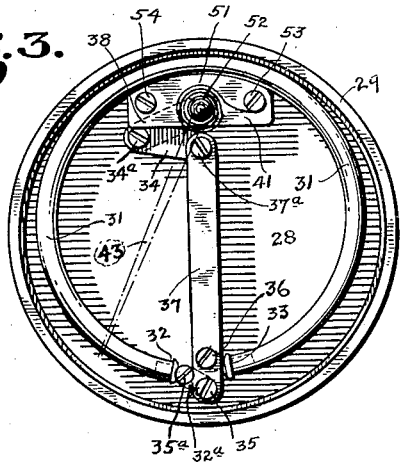
Fig. 3 is a front elevation of gauge with calibrated dial removed.
Figure 4:
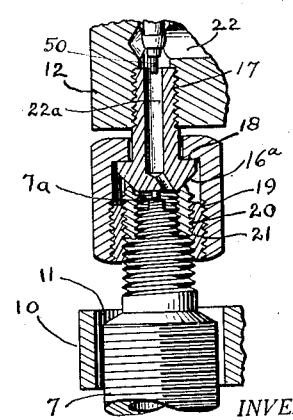
Fig. 4 is a vertical section of modified form of plunger and attaching means to tire stem.

A frame 9 is provided, which serves as a body portion and mounting member for the gauge, and may have an extension 10 having an opening 11 therein to receive the upper end of the tire stem so as to furnish a guide for the frame. A second extension portion 12 is provided in my preferred construction at an upper portion of the frame, and is provided with an opening 13 to receive a one-way valve 14 of any suitable type. The lower and upper extensions are in spaced relation, and the upper extension is provided with a depending plunger 15 to bear against and depress the stem of the valve 7a and thereby maintain it normally open when the frame is operatively mounted on the tire stem. The plunger 15 seats tightly upon the open end of the valve stem 7 and may be provided with a washer or gland 16 of resilient material, as illustrated in Fig. 2, or, if desired, said plunger may be caused to seat tightly by forming its end 16a as a frustrum cone, but in either case, so that a plunger is formed to depress the stem of the valve 7a when the frame is securely mounted on the tire stem. For construction purposes I prefer that the plunger be made separate from the frame and threadedly mounted therein as at 17, and provided with a circumferential shoulder 18 near its lower end, said shoulder being engaged by a union nut 19 rotatable thereon which threadedly engages the tire stem at its open end portion 20. The nut 19 may be provided with relatively thick side walls, as in Fig. 2, to directly engage the tire stem, but for convenient manufacture in providing a substantially wide shoulder 18 for the plunger 15, the side walls of nut 19 may be made relatively thin, in which case there is provided a ferrule 21 threaded internally to engage the tire stem and threaded externally to engage the nut, as best shown in Fig. 4. When the nut 19 is tightened on the threaded valve stem, the plunger is drawn downwardly to open the valve 7a and form an air tight seat on the open end of the valve stem, and thus securely mount the frame on the tire stem, the opening 11 forming a guide and a support for the frame. A passageway 22 is provided in the frame 9, which passageway is continued through the plunger 15, as at 22a, so as to form a continuous passageway from the opening of the tire stem through the frame.

Mounted at the other end of the passageway 22 is an air pressure gauge, more fully described hereafter. The opening 13 connects with the passageway 22 as at 23, and has a cap 24 of well known type and mounts therein a disc 25 of flexible material, such as rubber, to make a tight closure of the opening 13, the valve 14 being preferably seated on the frame, as at 26, so as to normally prevent the escape of air at said seat.

Connected with the opening of passageway 22, and preferably by a tubular member 27, is a pressure gauge generally indicated 28 which is mounted to the frame 9, preferably in a housing 29 formed by a recess 30 in said frame. An arcuate Bourdon tube 31 is mounted intermediate its ends, as at 31a, so that an opening 31b therein connects with the passageway 22, and in my preferred form provides a pair of arcuate arms, having closed ends 32 and 33, which type of Bourdon tube is preferred because it absorbs sudden shock more smoothly and with less movement and less loss of set than such tubes mounted adjacent one end. The air pressure in the passage 22 is effective on the Bourdon tube 31 to cause the tube to increase its arc, which in turn increases the distance between its respective closed ends 32 and 33. One of the ends, for instance 33, is pivotally connected to a lever 37 adjacent its end, so that its pivot 36 forms a fulcrum point for the lever 37. The other end 32 of the Bourdon tube has pivotal connection to the lever 37 by a link 32a and the pivot pins 35 and 35a. It will be apparent that when the arms of the Bourdon tube are actuated radially outwardly by the air pressure, the lever 37 will respond to said movement, so that a link 34, to which lever 37 is pivoted at 37a will be reciprocated longitudinally. The link 34 is pivotally connected at 34a to a crank lever 38 fixedly mounted on a shaft 39, one end of which is pivoted in the frame at 40, and has bearing intermediate its length in a support 41 and extends transversely through a calibrated dial face 42 and mounts in front of said dial an indicator hand 43, the dial having slots therein 44 and 45, so that it may be rotated sufficiently to accommodate the calibrations of the dial to an accurate indication of pressure by the hand when the device is tested for accuracy. The opening of the recess 30 is closed by a transparent face 47, preferably of non-breakable glass, mounted on the housing by a rim 48 which may threadedly engage the housing and be locked thereon by any suitable means, such as a screw 49.

While it is desirable to eliminate the use of springs as an actuating medium for the gauge, it may be desirable, where the indicator receives unusually rough usage, as on trucks, or in high speed rotation of the wheel, or very rough highways to steady the action of the indicator hand 43 by use of a suitable light spring 51 which may be attached to a collar 52 frictionally mounted on shaft 39 and having its other end attached to any suitable base such as screw 53 which supports the bearing 41 to the housing 29. An additional screw 54 supports the other end of bearing 41 and this screw extends through the slot 44 and thereby supports the dial in its proper relation to the calibrations 55 and the accurate adjustment thereof relative to the hand 43. Additional supports may be provided to position the dial face, if desired, but since these would be similar to screw 54, and within the range of mechanical skill, one of such supports only is shown.

In operation, the frame is secured to the tire stem by the manual manipulation of nut 19 which, by drawing plunger 15 into contact with the stem of valve 7a, depresses and maintains open the valve 7a of the tire stem, the air within the tire being thereby permitted to flow through passageways 22a and 22 to the Bourdon tube of gauge 28 and there indicate the pressure in the tire. If the pressure in the tire is below the predetermined amount, the tire may be filled through the opening 13 and valve 14 which opens to pressure inwardly and closes to pressure outwardly. If the pressure be greater than the predetermined amount, the excess may be exhausted by pressure of the spring actuated valve stem 50, the gauge indicating the pressure at all times.

It will be observed that the vertical dimension of the gauge partially overlies the distance between the end of the tire stem 7 and the felloe, which accommodates the gauge to wheels having short spokes. Due to short spokes in artillery type wheels and also to the criss-cross or intersecting of spokes of wire wheels, and due to solid plates of disc wheels, gauges of this type cannot be rotated as an entirety on the vertical axis of the tire stem, and for this reason it is a particular advantage that the nut 19 may rotate on shoulder 18, and thus provide means to attach the structure to a tire stem without rotating the gauge, thus also insuring that the sight face of the gauge will be properly positioned with its face in full view.

Having thus described the invention what is claimed as new and desired to be protected by Letters Patent is:—

1. An air pressure indicator for pneumatic tires which comprises a body portion that includes a back wall and a front cap to enclose a chamber, the cap having a transparent front, gauge elements in said chamber including indicator parts visible through said transparent front, an extension from the rear face of said back wall, a nipple secured in and projecting radially from said extension, a swivel nut mounted on and carried by the end of said nipple and adapted to screw on the end of the valve stem of a tire, said nipple and nut having provisions to engage the end of said valve stem with binding friction when the nut is screwed home, said nipple having a portion to engage the air valve of the valve stem and hold it open when the indicator is attached to the valve stem, said nipple and said extension and said body portion having an air duct for effecting communication between the valve stem and the gauge elements in said chamber to actuate the same, and a valve stem carried by said extension through which the tire may be inflated via said duct, said extension, said nipple and said swivel nut lying beyond said back wall and within the rearwardly extended compass of said body portion.

2. In an air pressure indicator for pneumatic tires which tires have a valve stem including a body with an end of reduced diameter; a case having a transparent front and a chamber enclosing Bourdon tube gauge elements with a dial and a pointer visible through said transparent front, said case including a back wall, an extension projecting rearwardly from said back wall, a swivel-nut coupling member formed to fit on the reduced-diameter end of the valve stem, means to mount said coupling member on said extension with the axis of the coupling member parallel to the plane of said back wall, said means-to-mount being so located with respect to said back wall as to hold said coupling member in proximity to said back wall and within the rearwardly extended compass of said case whereby said case will in part overlap the body of said valve stem and lie in proximity thereto, said extension and said mounting means having an air passage from the coupling member to and cooperatively communicating with the gauge elements in said case, means for holding the air valve of the valve stem open when the indicator is attached to the valve stem, and means including a one-way-valved passage communicating with said air passage of said extension through which the tire may be inflated.

3. In an air pressure indicator for pneumatic tires, which tires having a valve stem with a threaded end; a case having a transparent front and a chamber enclosing Bourdon tube gauge elements with a dial and a pointer visible through said transparent front, said case including a back wall, a lug carried by the back wall of said case and constituting an integral structure therewith, a nipple threaded into a threaded socket in said lug, a swivel nut coupling member swivelly carried by said nipple, the coupling member being extended in back of said case a distance less than the thickness of the case whereby the coupling member will lie in proximity to the back of the case, said coupling member being formed to screw onto the end of the valve stem, a washer within said coupling member to engage the end of the valve stem, said nipple and said lug having an air passage from the coupling member to the gauge elements, and a projection from said lug having one-way-valved passage communicating with said air passage through which the tire may be inflated, said lug and said coupling member exclusive of said projection lying within the rearward extended compass of said case and said projection extending beyond said compass and all said parts so cooperating with the valve stem when the indicator is connected thereto as to locate the gauge parallel with the plane of the wheel and in part overlapping the body of said valve stem adjacent the rim.

In testimony whereof we have affixed our signatures.

JOHN MARCHESE.
MAURICE BYRON D'ORSAY.